United States Patent
Jain et al.

(10) Patent No.: US 11,175,807 B1
(45) Date of Patent: Nov. 16, 2021

(54) INTELLIGENT CONTEXTUAL VIDEO THUMBNAIL DISPLAY

(71) Applicant: Adobe Inc., San Jose, CA (US)

(72) Inventors: Ajay Jain, UP (IN); Sanjeev Tagra, Haryana (IN); Sachin Soni, New Delhi (IN); Eric Kienle, Portland, OR (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 17/166,495

(22) Filed: Feb. 3, 2021

(51) Int. Cl.
| | |
|---|---|
| *G06F 3/0484* | (2013.01) |
| *G06F 3/0481* | (2013.01) |
| *G06N 5/04* | (2006.01) |
| *H04L 12/58* | (2006.01) |
| *H04L 29/08* | (2006.01) |

(52) U.S. Cl.
CPC ........ *G06F 3/04842* (2013.01); *G06F 3/0481* (2013.01); *G06N 5/04* (2013.01); *H04L 51/08* (2013.01); *H04L 67/22* (2013.01)

(58) Field of Classification Search
CPC .................................................. G06F 3/04842
See application file for complete search history.

(56) References Cited

U.S. PATENT DOCUMENTS

| | | | | |
|---|---|---|---|---|
| 10,620,796 | B2* | 4/2020 | Cueto .................... | G06F 3/0488 |
| 2006/0242602 | A1* | 10/2006 | Schechter ............... | G06F 9/451 |
| | | | | 715/838 |
| 2014/0325359 | A1* | 10/2014 | Vehovsky ............ | H04N 21/854 |
| | | | | 715/723 |
| 2015/0153910 | A1* | 6/2015 | Wheeler ............... | G06F 3/0485 |
| | | | | 715/719 |
| 2016/0328877 | A1* | 11/2016 | Cui ....................... | G06T 1/0007 |

OTHER PUBLICATIONS

Newberry, Christina "Video Thumbnail Guide: How to Inspire Clicks", Vidyard, published Jan. 29, 2020. URL: https://www.vidyard.com/blog/video-thumbnail/.

Gillespie, Chris, "Video Email Marketing: How to Use Embedded Video to Boost Sends", Vidyard, published Sep. 14, 2020. URL: https://www.vidyard.com/blog/video-email-marketing/.

Marshall, Carla, "How to Make Custom Thumbnails on YouTube", VidIQ, published Mar. 24, 2020. URL: https://vidig.com/blog/post/how-to-custom-thumbnails-youtube/.

Ullberg, Rielle, "How to Add Personalization to Video Landing Pages", BlueRush, published Apr. 3, 2019. URL: https://www.bluerush.com/blog/personalization-video-landing-pages/.

(Continued)

*Primary Examiner* — Roland J Casillas
(74) *Attorney, Agent, or Firm* — Kilpatrick Townsend & Stockton LLP

(57) ABSTRACT

Techniques are provided for customizing, based on a user's activity over time, the selection of a video thumbnail for inclusion as a selectable interface element or element of a graphical interface. A server computer identifies events associated with prior interactions of a user and computes a time-decayed metric based on the time of a predicted future action of the user in comparison to a respective time of each identified event. Based on the time-decayed metric, the server computer selects a video thumbnail that is more relevant to the first event than the second event for presentation to the user.

20 Claims, 11 Drawing Sheets

(56) References Cited

OTHER PUBLICATIONS

"Personalize your Video Thumbnail", Hippo Video, modified Jul. 25, 2019. URL: https://help.hippovideo.io/support/solutions/articles/19000097488-personalize-your-video-thumbnail.

"Add a Personalized Video Link to Your Email Campaign" Hippo Video, modified Jul. 25, 2019. URL: https://help.hippovideo.io/support/solutions/articles/19000098229-add-a-personalized-video-link-to-your-email-campaign.

"Personalize your video for MailChimp email campaigns", Hippo Video, modified Jul. 25, 2019. URL: https://help.hippovideo.io/support/solutions/articles/19000097360-personalize-your-video-for-mailchimp-email-campaigns.

* cited by examiner

INTELLIGENT CONTEXTUAL VIDEO THUMBNAIL DISPLAY

TECHNICAL FIELD

This disclosure generally relates to using computer software to control, within a graphical interface, presentation of media or functions for interacting with media. More specifically, but not by way of limitation, this disclosure relates to techniques for customizing, based on a user's activity over time, the selection of a video thumbnail for inclusion as a selectable interface element or element of a graphical interface.

BACKGROUND

Digital content such as videos are increasingly popular. Generally, when providing digital content online, the aim is to reach the largest amount of viewers possible. The thumbnail used for a video has a substantial effect on whether or not a user views the video.

In some systems, a creator chooses a custom thumbnail for a video. The creator may select a frame from the video or other image that the creator thinks is eye-catching. This is a manual process that results in the same thumbnail being shown for all viewers. In other systems, tools automatically identify frames in a video that can be a good candidate for a thumbnail for the video. Generally, the creator manually selects from a set of candidate thumbnails, and the suggested thumbnail is presented to all users. Both of these solutions do not factor in how viewers would actually respond to the selected image. To that end, user testing on various thumbnails can be performed to identify a user response. This again has several limitations. User testing is time-consuming and manual. Further, user testing is based on the user's perspective at one point of time that may grow stale or inaccurate over time.

SUMMARY

Certain aspects involve techniques for using predictive models to identify a thumbnail for display to a particular user based on the user's behavior.

In some aspects, a computer-implemented method includes identifying, by a server computer, events associated with prior interactions of a user, determining, by the server computer, a time of a predicted future action of the user, computing, by the server computer, a time-decayed metric based on the time of the predicted future action of the user in comparison to a respective time of each event, of the identified events, wherein a first event that is closer in time to the predicted future action than a second event has a greater contribution to the time-decayed metric than the second event, selecting, by the server computer and based on the time-decayed metric, a particular video thumbnail that is more relevant to the first event than the second event, receiving, by a server computer, an indication of user interaction with a link associated with an interactive content item to be provided to a computing device associated with the user, wherein the indication of user interaction is associated with the user, and including, by the server computer and responsive to receiving the indication of user interaction with the link, the selected video thumbnail in a selectable interface element in the interactive content item, wherein an interaction with the selectable interface element causes display of a video associated with the particular video thumbnail.

In some aspects, the time-decayed metric is a score computed by the server computer as a function of an identified current stage of behavior of the user. In some aspects, the score for a given event is an exponential function of a time of the given event subtracted from the time of the predicted future action of the user. In some aspects, prior to selecting the video thumbnail, the method further includes causing display of the interactive content item with a default thumbnail, wherein the server computer updates the interactive content item to display the video thumbnail upon selecting the video thumbnail.

In some aspects, the indication of user interaction with the link is a first indication of user interaction with the link and the video thumbnail is a first video thumbnail, and the method further comprises detecting, by the server computer, user interaction with the selectable interface element, based on detecting the user interaction with the selectable interface element, updating, by the server computer, the events associated with the prior interactions of the user, receiving, by the server computer, a second indication of user interaction with the link, identifying, by the server computer, the updated events associated with prior interactions of the user, and, responsive to receiving the second indication and identifying the updated events, including, by the server computer, a second video thumbnail in the selectable interface element in the interactive content item to be provided to the computing device associated with the user, wherein the second video thumbnail is different than the first video thumbnail and associated with the same video.

In some aspects, the server computer determines the time of the predicted future action of the user using a clustering model to identify other users associated with similar prior events and predict the time of the future action of the user based on times of identified actions of the other users. In some aspects, the user is clustered with the other users based on a sequence of events associated with the user and a sequence of events associated with the other users. In some aspects, the interaction with the link is associated with a webpage or an electronic mail (email) message.

In some aspects, a computing system comprises a processor and a non-transitory computer-readable medium coupled to the processor, the non-transitory computer-readable medium including instructions which, when executed by the processor, cause performance of a method comprising receiving an indication of user interaction with a link associated with an interactive content item; and a step for selecting a particular video thumbnail, of a plurality of potential thumbnails of a video, based on a time-decayed metric and events associated with prior interactions of a user associated with the interaction; and, responsive to receiving the indication of user interaction with the link and selecting the video thumbnail, including the selected video thumbnail in a selectable interface element in the interactive content item to be provided to a computing device associated with the user, wherein an interaction with the selectable interface element causes display of a video associated with the particular video thumbnail.

In some aspects, a non-transitory computer-readable medium has instructions stored thereon, the instructions executable by a processing device to perform operations comprising: receiving an indication of user interaction with a link associated with an interactive content item; identifying events associated with prior interactions of a user associated with the user interaction; computing a time-decayed metric based on the time of a predicted future action of the user in comparison to a respective time of each event, of the identified events, wherein a first event has a greater contribution to the time-decayed metric than a second event; selecting, based on the time-decayed metric, a particular video thumbnail that is more relevant to the first event than the second event; and responsive to receiving the indication of user interaction with the link and selecting the video thumbnail, including the selected video thumbnail in a selectable interface element in the interactive content item to be provided to a computing device associated with the user, wherein an interaction with the selectable interface element causes display of a video associated with the particular video thumbnail.

These illustrative aspects are mentioned not to limit or define the disclosure, but to provide examples to aid understanding thereof. Additional aspects are discussed in the Detailed Description, and further description is provided there.

BRIEF DESCRIPTION OF THE DRAWINGS

Features, aspects, and advantages of the present disclosure are better understood when the following Detailed Description is read with reference to the accompanying drawings.

DETAILED DESCRIPTION

Figure 1:
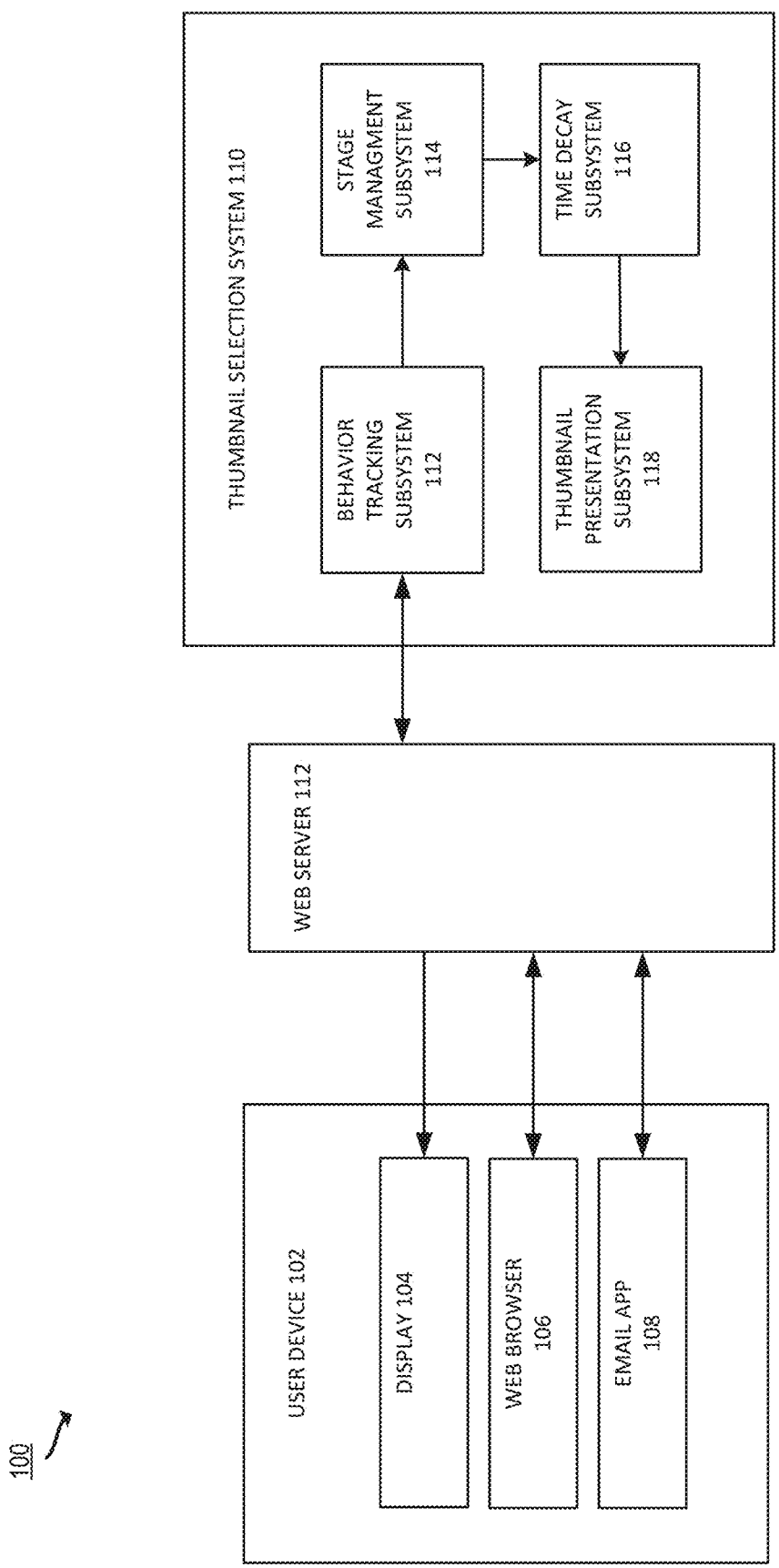
FIG. 1 depicts an example of a computing environment for selecting and displaying a video thumbnail to a particular user based on the user's activity over time, according to certain aspects of the present disclosure.

The present disclosure involves customizing, based on a user's activity over time, the selection of a video thumbnail for inclusion as a selectable interface element or element of a graphical interface. As used herein, a video thumbnail refers to an image shown in interface element corresponding to a video, when the interface element has been loaded but the video has not yet begun playing. The video thumbnail may include one or more of a still from the video, other images, and/or text. As noted above, conventional solutions for selecting a video thumbnail for inclusion in a graphical interface often rely on time-consuming manual selection and/or user testing. Customization of such interfaces is limited, and the existing solutions do not take into account the potential viewers' changing preferences and interests over time. Certain techniques described herein address this issue by selecting video thumbnails via a time-decay algorithm that, when applied to time-series data associated with user interests, results in a selection of a video thumbnail that accounts for the user's interest in a particular time or phase. These techniques allow for improved customization of interfaces by, for example, displaying different thumbnails to different users, and even different thumbnails to a same user at different times, based on changing interests.

The following non-limiting example is provided to introduce certain aspects. In this example, a server computer updates an interactive content item, which is to be provided to a computing device associated with a given user, to include a video thumbnail. For instance, the server computer receives an indication of user interaction with a link associated with the interactive content item, such as a click on a link in a list of emails that causes a particular email with a video about ovens embedded therein to be displayed on a device operated by the user. Responsive to receiving the indication of the user interaction, the server computer includes the selected video thumbnail in a selectable interface element in the interactive content item (e.g., the video thumbnail is displayed in a selectable embedded video player in the email). An interaction with the selectable interface element causes display of a video associated with the particular video thumbnail. Accordingly, the interactive content item is updated based on up-to-date and user-specific information to display a video thumbnail that is likely to be appealing to the user, increasing the likelihood of click-through.

To select the video thumbnail in this example, the server computer identifies events associated with prior interactions of the user. For example, the server computer identifies a data store which includes logs of user interactions with one or more websites, such as viewing a particular webpage, video, or image, clicking on a link, sending an electronic message, and so forth. The server computer uses the logs of user interactions to determine a time of a predicted future action of the user. For instance, the server computer applies a predictive model to event data corresponding to prior interactions of the user to predict when the user will perform some action, such as viewing a particular website or video, enrolling in a course, or making a purchase.

As a specific example, the server computer identifies event data including events associated with the user of interest, as well as events associated with other users. The server computer clusters the event data to identify users with similar patterns of behaviors. The server computer identifies a timeframe in which these users performed a corresponding action. For example, like the user of interest, ten other users watched a certain video on one day and emailed a certain person on another day, then enrolled in a particular class ten days later. The server computer predicts that the user will perform the action on the same timeframe as other users in the cluster, thereby arriving at the time of the predicted future action of the user.

Continuing with this example, the server computer computes a time-decayed metric based on the time of the predicted future action of the user in comparison to a respective time of each event, of the identified events associated with the user. The server computer uses the time-decayed metric to weight scores attributed to the events, such as by giving each event an attribution score that is multiplied by a negative exponential time-decay factor. For instance, a first event that is closer in time to the predicted future action than a second event has a greater contribution to the time-decayed metric than the second event. Thus, more recent events are weighted more heavily and contribute more towards the ultimate thumbnail selection.

Continuing with this example, the server computer selects, based on the time-decayed metric, a particular video thumbnail that is more relevant to the first event than the second event. For example, based on the time-decayed metric, the server computer determines that the user has been increasingly viewing articles related to oven heating power (including the first event), but has also viewed articles related to the aesthetic appearance of ovens (including the second event). Using a time-decayed attribution score, the server computer selects, for inclusion in an interactive content item or other graphical interface, a video thumbnail that shows content related to oven heating power. Thus, the video thumbnail can be included in the interactive content item or other graphical interface responsive to interaction that access the interactive content item, such as clicking on a particular email in the example above.

As described herein, certain aspects provide improvements to computing environments by solving problems in efficiently and accurately displaying an appropriate video thumbnail via an interactive content item. The system applies particular rules in weighting and selecting areas of expressed user interest for use in identifying the appropriate thumbnail for display. These specific rules include predicting a future action by clustering time-series event data for a set of users and applying time-decay modeling to select and display a contextually relevant thumbnail. In contrast to prior methods of attempting to customize a thumbnail for a user, which are time-consuming and often cannot be fully automated, the present techniques can be used to automatically present a user with a video thumbnail that captures not only the user's present interests but takes into account the user's journey in interests over time.

Example of an Operating Environment for Video Thumbnail Selection

FIG. 1 depicts an example of a computing environment 100 in which content presentation tools use predictive models to select and present user-specific video thumbnails. The computing environment 100 includes a user device 102 configured to display a video thumbnail via a display 104 and a thumbnail selection system 110 that is used to analyze user behavior and use the results of the analysis to select an appropriate video thumbnail. The thumbnail selection system 110 includes an event tracking subsystem 112, a stage management subsystem 114, a time decay subsystem 116, and a thumbnail presentation subsystem 118.

The various subsystems of the thumbnail selection system 110 can be implemented in the same computing system or different, independently operated computing systems. For example, the event tracking subsystem 112 could be separate entity from the stage management subsystem 114, the time decay subsystem 116, and the thumbnail presentation subsystem 118, or the same entity. Different, independently operating web servers 109 can communicate with the thumbnail selection system 110 to cause display of a video thumbnail on a user device 102, or the thumbnail selection system 110 can itself cause display of a video thumbnail on a user device 102. While the system of FIG. 1 can be used, other aspects can involve the thumbnail selection system 110 being built into a software application executed on the web server 109, e.g., as a plug-in to video serving software.

Some aspects of the computing environment 100 include a user device 102. The user device 102 is a device used by a user (e.g., a viewer) to view content such as videos, websites, and emails. Examples of a user device include, but are not limited to, a personal computer, a tablet computer, a desktop computer, a processing unit, any combination of these devices, or any other suitable device having one or more processors. A user of the user device 102 may view content via a display 104 (e.g., a monitor, touchscreen, etc.). The content can be viewed on a web browser 106 as the user navigates through various Web sites. The content can additionally or alternatively be viewed via an application such as email application 108 that the user uses to send and receive emails, a video streaming application, or the like.

The user device 102 is communicatively coupled to the thumbnail selection system 110 via a data network. Examples of the data network include, but are not limited to, internet, local area network ("LAN"), wireless area network, wired area network, wide area network, and the like.

In some aspects, the user device 102 is further communicatively coupled to a Web server 109, which can transmit information to cause display of videos and other content on the user device 102.

The thumbnail selection system 110 is configured to analyze user behavior over time and use the results of the analysis to display a relevant video thumbnail. The thumbnail selection system 110 includes event tracking subsystem 112, stage management subsystem 114, time decay subsystem 116, and thumbnail presentation subsystem 118.

The event tracking subsystem 112 collects information about events associated with users. In a non-limiting example, the information about events includes records such as browser history (e.g., based on detecting a user clicking on a link, adding an item to a cart, purchasing an item, navigating to a page, and so forth). Events may further be associated with email exchanges, transcripts of phone calls, or in-store transactions such as a purchase or return. The event tracking subsystem 112 uses the information about the events to manage event datasets for analyzing correlated events, such as the behavior of a particular user over time. For example, in some cases the event information is collected from one or more websites (e.g., using cookies or other tracking software). Alternatively, or additionally, the event can be collected from emails (e.g., via an email application or website).

In some aspects, the event tracking subsystem 112 identifies, monitors, tracks, and records attributes associated with one or more events. Examples of these attributes include what webpages the user is currently surfing through, what items, objects, and assets the user is currently interacting with (e.g., clicking), a time duration that the user remains on any of these assets, what channel the user is currently walking through, and what device user is operating to view or interact with the assets. The event tracking subsystem 112 stores some or all of the identified attributes to the a profile stored for the user. In some implementations, each event is mapped to a unique user identifier so that the events are indexed to the corresponding users.

The stage management subsystem 114 identifies stages based on user behaviors over time. In some aspects, the stage management subsystem 114 maps a user's journey amongst various stages. For example, the stages can be stages of a marketing pipeline. The stage management subsystem 114 may assign the user to different stages based on attributes and time spent in a given stage as the user progresses through the marketing pipeline. The stage management subsystem 114 passes stage information to the time decay subsystem 116 for further processing.

The time decay subsystem 116 applies time decay modeling to adjust the contribution that different detected user behaviors will have on the attribute selection algorithm. The time decay subsystem 116 may compute one or more weighting values used to adjust an attribution score for a particular stage in the user's journey. This results in one or more time-decayed metrics (also referred herein to as time-decayed attribution scores).

The thumbnail presentation subsystem 118 selects and presents an appropriate thumbnail based on the time decayed attribute information generated by the time decay subsystem 116, stage management subsystem 114, and event tracking subsystem 112. The thumbnail presentation subsystem 118 may include software and/or hardware configured to select and display a custom video thumbnail based on time-decayed user event data.

Figure 2:
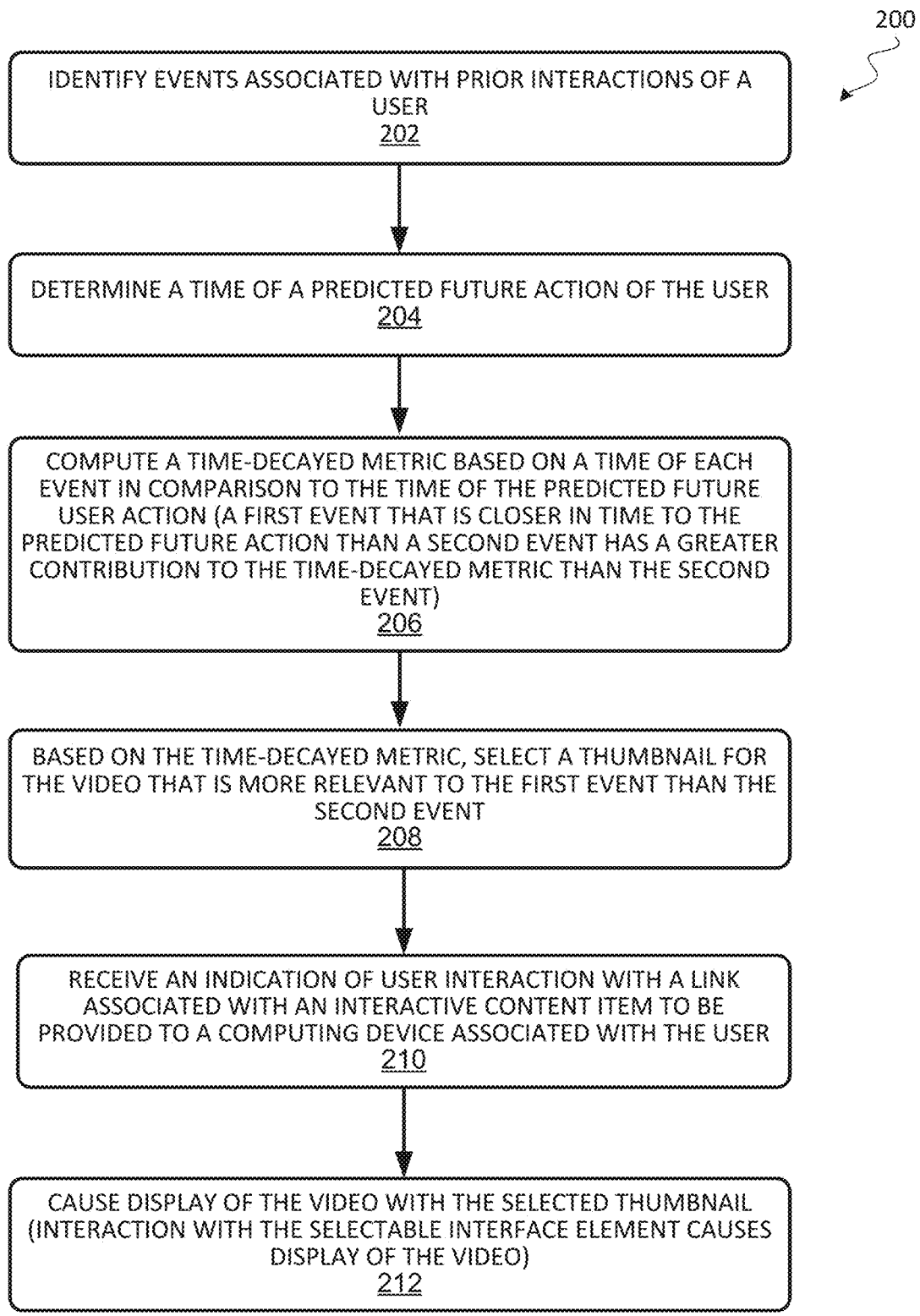
FIG. 2 depicts an example of operations performed by the computing environment of FIG. 1 to select and display a relevant video thumbnail, according to certain aspects of the present disclosure.

Examples of Operations for Contextual Video Thumbnail Selection and Presentation FIG. 2 depicts an example of a method 200 for identifying and presenting a relevant video thumbnail based on identified user preferences over time. In some aspects, one or more processing devices implement operations depicted in FIG. 2 by executing suitable program code. For illustrative purposes, the method 200 is described with reference to certain examples depicted in the figures. Other implementations, however, are possible. The method 200 is performed by a thumbnail selection system such as that depicted in FIG. 1 (e.g., a server computer in the thumbnail selection system).

Prior to the processing of the method 200, the thumbnail selection system gathers event data for one or more users. Gathering event data may include retrieving event data from a user device. Alternatively, or additionally, gathering the event data may include generating event data. For example, the thumbnail selection system retrieves browsing data from a user device and generates a timestamp indicating a time at which the browsing data was retrieved.

In some implementations, when a user first navigates to a particular website, the thumbnail selection system initiates a campaign for monitoring the user for the purposes of presenting the user with a tailored video thumbnail. The thumbnail selection system assigns a unique user identifier to the user. In some implementations, the thumbnail selection system itself tracks the user's online activity (e.g., by monitoring a cache of the user's browser). Alternatively, or additionally, the thumbnail selection system provides the user identifier to an external computing device, thereby causing the external computing device to monitor the user's activity on a user device, webpage, and/or email application. Events associated with the user that are monitored and recorded can include behavior generated from user interaction with a website such as links clicked, content read, duration of time stayed on any article, pictures double clicked, sections visited, etc. Alternatively, or additionally, events may be collected from other channels such as report cards, in-store purchases or other in-person interactions, and so forth. Such events are monitored and recorded in association with the user identifier. In some aspects, the identifier for each user is an anonymous identifier. In some aspects, the system stores the events as time-series data, tracking each click, view, etc. with a timestamp.

At block 202, the thumbnail selection system 110 (e.g., the event tracking subsystem 112) identifies a set of events associated with prior interactions of the user. In some implementations, the thumbnail selection system 110 queries a database that is part of the thumbnail selection system using a user identifier to identify data corresponding to the user. Alternatively, or additionally, the thumbnail selection system 110 provides an external computing device with the user identifier, and the external computing device provides information about the set of events associated with the prior interactions of the user back to the thumbnail selection system.

A processing device executes program code of the thumbnail selection system 110 to implement block 202. For example, the program code for the thumbnail selection system 110, which is stored in a non-transitory computer-readable medium, is executed by one or more processing devices.

In some aspects, the thumbnail selection system 110 assigns attribution scores to each of the identified events. The attribution score assigns a value to each of these events, based on how the identified events contribute in some manner to a desired outcome such as watching a video, a conversion such as a sale, or passing an online course. For example, based on analysis of historical user data, the system determines that watching videos contributes more heavily to the likelihood of an imminent purchase than reading text, and weights an event corresponding to a user watching a video with a higher attribution score (e.g., attribution score=5) than an event corresponding to a user reading text (e.g., attribution score=2).

In some aspects, the thumbnail selection system 110 (e.g., the stage management subsystem 114) determines a current stage corresponding to the user events over time. In some aspects, the stage management subsystem 114 maps a user's journey amongst various stages. For example, these stages may be stages of a marketing pipeline, stages of a student's education, or stages representing different viewing patterns within a video streaming site. Each stage is associated with certain attributes in the user's profile. Every user can demonstrate their own set of attributes per stage. The delineation between stages may be established according to time (e.g., each stage lasts a day or a week, or the stages have varying time lengths such as 2 days for stage 1, 7 days for stage 2, 3 days for stage 3, etc.). Alternatively, or additionally, stages may be established based on detected events corresponding to user actions. For example, in the marketing context, users that are contacting a sales representative can be considered farther along in the marketing pipeline than users viewing a website for a product for the first time.

In some aspects, the thumbnail selection system stores user stage data in a stage data structure. As an example, a stage data structure is defined as:

Stage
{
User {1 . . . n};
Attributes {1 . . . m}
}

Figure 3:
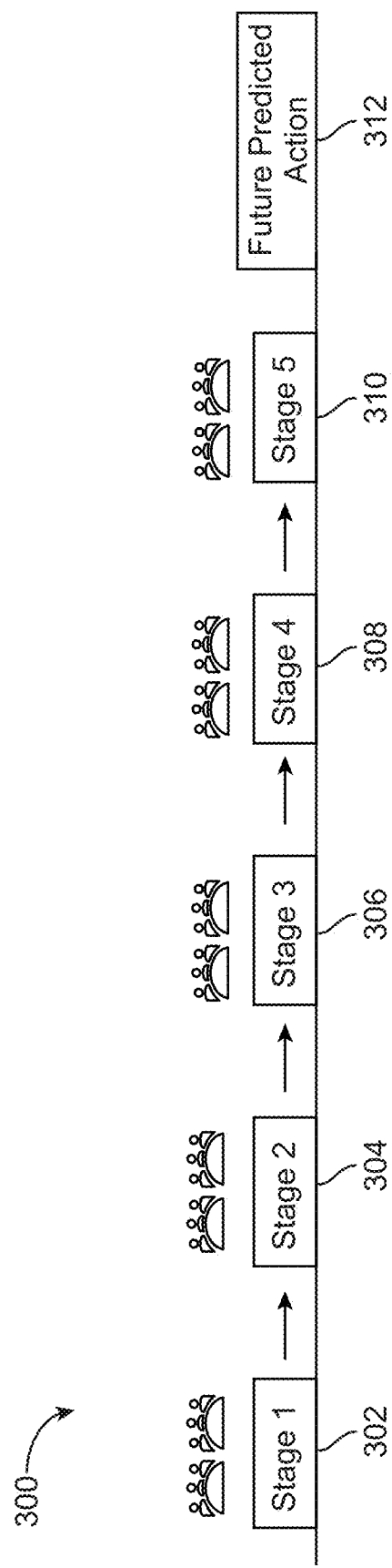
FIG. 3 depicts an example of the progression across stages for a particular user, according to certain aspects.

FIG. 3, described in further detail below, shows an illustration of the progression across a set of stages for a particular user.

At block 204, the thumbnail selection system 110 (e.g., the time decay subsystem 116) determines a time of a predicted future action of the user. The predicted future user action may, for example, be passing a quiz, watching a movie, or making a purchase (e.g., a conversion). In some aspects, the thumbnail selection system determines the time of the predicted future user action by comparing the events and stages tracked for the user of interest to events and stages tracked for other users.

In some aspects, the thumbnail selection system determines the time of the predicted future action of the user using a predictive model based on historical data associated with events and actions associated with other users. For example, the thumbnail selection system applies a clustering model to identify other users associated with similar prior events and predict the time of the future action of the user based on times of identified actions of the other users. The thumbnail selection system applies a clustering algorithm to cluster the user with other similar users. As a specific example, web browsing data for a set of users is clustered based on a set of attributes, and the user of interest is clustered with other users that have been looking to purchase a high-end vehicle with a particular focus on the aesthetic appeal of the vehicle. In some implementations, the user is clustered with the other users based on a sequence of events associated with the user and a sequence of events associated with the other users. For example, if the user interacted with performance-related content in stage 1 and reliability-related content in stage 2, the user is clustered with other users that progressed from performance-related content in stage 1 to reliability-related content in stage 2. If the user is behaving same way at each stage with respect to a certain set of users, those users are clustered together. Users clustered together are more likely to perform a future user action in a similar time frame. As a specific example, most users clustered with the user of interest have converted four days after being halfway through stage 3. Therefore, there is a high chance this user, that is halfway through stage 3, also will convert in four days as there are high chances he will also follow the same behavior of other users in this same cluster.

At block 206, the thumbnail selection system 110 (e.g., the time decay subsystem 116) computes a time-decayed metric based on a time of each event in comparison to the time of the predicted future user action. The time decayed metric may be a function of one or more of attribution score(s) for events and/or a time elapsed or predicted to elapse before the occurrence of some event. For example, an algorithm is applied to the event data collected for the user to adjust weights to focus more on more recent activity. As a specific example, the stages are used to compute the time-decayed metric. Each stage is time plotted based on the time elapsed in each stage when the user moved to the subsequent stage (e.g., the user takes 2 days to move from stage 1 to stage 2 and another 2 days when moving from stage 2 to stage 3). In some implementations, a time-decayed metric may be computed for each stage. The time-decayed metric helps in allocating and computing weights assigned to each parameter collected in previous and recent interactions of the user according to the time value when user has interacted with those elements. This is done to assign appropriate weightage to different assets at various stages for the user.

In some aspects, the time-decayed metric is based on a current stage of behavior of the user. For example, the weight is proportional to the stage number (1, 2, 3, etc.). Alternatively, or additionally, the time-decayed metric is a function of an exponential function of a time of the given event subtracted from the predicted time of the predicted future action of the user.

As a specific example, the attribution score A at any stage is computed as $$A = 2^{-x/7}$$

where x is the number of days from the time of the predicted future action of the user. The attribution score at stage 1, where x=10, would be computed as:

$$A = 2^{-x/7} = 2^{-10/7} = 2^{-1.43} = 0.3711.$$

The attribution score at stage 2, where x=8, would be computed as:

$$A = 2^{-x/7} = 2^{-8/7} = 2^{-1.14} = 0.453.$$

The attribution score at stage 3, where x=6, would be computed as:

$$A = 2^{-x/7} = 2^{-6/7} = 2^{-0.857} = 0.55.$$

Thus, attributes demonstrated at later stages (e.g., closer to the predicted future user action) are given more weight compared to parameters at previous stages. In other words, for a first event that is closer in time to the predicted future action than a second event, the first event has a greater contribution to the time-decayed metric than the second event. Further, the time-decayed metric can also be based on the time spent in each stage.

Accordingly, in order to compute the most relevant and contextual metric for thumbnail selection customized for each user, time-decay modeling is applied to the attributions collected across stages for the user, so that more recent stages are weighted preferentially.

At block 208, the thumbnail selection system 110 (e.g., the thumbnail presentation subsystem 118) selects a video thumbnail based on the time-decayed metric. As described above, the time-decayed metric can be a function of the user's cache records, behavioral tracking, and how these attributes change over time. The time-decayed metric further places more emphasis on more recent events. For example, for a first event that is more recent than a second event, the thumbnail selection system selects a particular video thumbnail that is more relevant to the first event than the second event. For example, the user watched a video about car performance in stage 1 and clicked on several items related to car interiors in stage 2. In this case, the thumbnail selection system may select a thumbnail related to car interiors based on the time-decayed metric.

In some aspects, the thumbnail selection system identifies a mapping between the most recent, relevant, and contextual interest, engagement, attribution asset with the corresponding attributes in a thumbnail. A time-decayed metric or attribution score for an event or set of events may be compared to other time-decayed metrics to identify the most current and relevant concepts or events. For example, based on the time-decayed metric, the thumbnail selection system determines that the user has increasingly been interested in food on cruises because food-related events have a highest attribution score, compared to other events such as activity-related events. The thumbnail selection system has previously configured a set of thumbnails for a marketing video about a cruise. The thumbnails include one that shows activity-related content, one that shows location-related content, and one that shows food-related content. The thumbnail selection system uses the mapping to select the thumbnail that shows food-related content, using the time-decayed metric to identify the current area of user interest.

At block 210, the thumbnail selection system 110 receives an indication of user interaction with a link associated with an interactive content item to be provided to a computing device associated with the user. The indication of user interaction is associated with the user. The interactive content item may, for example, be an embedded video player in a webpage or email, of which the interaction with the link causes display. For example, the user clicks a link to navigate to a webpage that displays a video player. As another example, the user interacts with a link to an email in an email application to trigger the loading of an email with an embedded video player. In some implementations, the thumbnail selection system initiates the display of the interactive content item with a default or randomly selected thumbnail, prior to selecting a custom thumbnail for display at block 212. Alternatively, or additionally, the interactive content item loads with the selective thumbnail.

At block 212, the thumbnail selection system 110 (e.g., the thumbnail presentation subsystem 118) includes the selected video thumbnail in a selectable interface element in the interactive content item. The selectable interface element may, for example, be a portion of an embedded video player that, upon detection of user interaction, causes the video to play (e.g., a play button). In some implementations, the thumbnail selection system may transmit instructions to an external web server that hosts the web site, thereby causing the external web server to serve the thumbnail with the interactive content item on a website or email displayed on a user device associated with the user. Alternatively, or additionally, the thumbnail selection system may itself serve the thumbnail for display on the user device associated with the user.

In some aspects, an interaction with the selectable interface element causes display of a video associated with the particular video thumbnail. For example, if the user clicks on the video thumbnail, then the video plays.

As noted above with respect to block 210, in some aspects, prior to selecting the video thumbnail, the thumbnail selection system causes display of the interactive content item with a default thumbnail. In such aspects, the thumbnail selection system updates the interactive content item to display the video thumbnail upon selecting the video thumbnail.

In some aspects, the thumbnail selection system generates the video thumbnail contextually just-in-time on the spot after embedding a video in an email and after sending out the email the user and just when the user is about to view the video embedded in the email. When the user opens up the email, a fetch-me-thumbnail event goes to the marketing content server with the user identifier. The thumbnail selection system, on receiving this information, fetches the most relevant, latest, and contextual time-decayed metric, matches it to the video content being shown in the email, and sends back the thumbnail information that is to be displayed for the video embedded in the email in real time.

Alternatively, or additionally, in some implementations, a different device (e.g., Web server 109) serves the video player. The thumbnail selection system transmits an indication of the selected thumbnail to the Web server. The Web server causes display of the video player with the selected thumbnail.

In some aspects, the processing of blocks 202-212 are repeated when the user returns to a webpage, email, etc. that includes the content item. Based on what events have been detected in association with the user in the interim, a different thumbnail may be displayed for to the same user. The events detected may include the user interacting with the selectable interface element associated with the thumbnail displayed at block 212, and/or refraining from interacting with the selectable interface element associated with the thumbnail. For example, the indication of user interaction with the link is a first indication of user interaction with the link and the video thumbnail is a first video thumbnail. The thumbnail selection system detects user interaction with the selectable interface element (e.g., the user interacts with a play button overlaid on the thumbnail to play the video). Based on detecting the user interaction with the selectable interface element, the thumbnail selection system updates the events associated with the prior interactions of the user. Using the updated set of events, the thumbnail selection system repeats the processing of blocks 202-208 with the refreshed event data set.

The thumbnail selection system receives a second indication of user interaction with the link and identifies the updated events associated with prior interactions of the user. Responsive to receiving the second indication and identifying the updated events, the thumbnail selection system includes a second video thumbnail in the selectable interface element in the interactive content item to be provided to the computing device associated with the user. The second video thumbnail is different than the first video thumbnail and associated with the same video. For example, referring to FIG. 8, the system may display an image of a car exterior in thumbnail 804 when the user is in one stage interacting mainly with content related to the appearance of cars, and subsequently display an image of a car engine in thumbnail 806 when the user is in another stage interacting mainly with content related to the performance of cars.

The processing of the method 200 results in selection and display of a highly personalized and contextual thumbnail, resulting into a higher probability of attracting the user to interact with the selectable interface element to view the video. Instead of displaying an arbitrary, traditional video thumbnail, the system advantageously selects the video thumbnail corresponding to the most contextual, relevant and recent attribution shown by the user. This increases the probability of the click-thru rate of the video in the email or when user sees that video on the website. These techniques further attract traffic and improve the quality of leads while maintaining useful information about user affinities over time. Further, these techniques can be used to identify, fetch, and display an appropriate video thumbnail just-in-time, greatly reducing latencies and excess processing associated with some prior techniques for selecting a video thumbnail for display.

Example of Stage Progression

FIG. 3 depicts an example of a flowchart 300 of the progression across stages for a particular user, according to certain aspects. As noted above, in some implementations, the thumbnail selection system tracks a user's journey amongst various stages 302-310, which may be stages towards some future predicted action of the user 312.

In this example, stage 1 302 is an initial stage in the user's journey towards the future predicted action 312. The predicted future action 312 is a conversion, where the user purchases a new car. Stage 1 starts when the user first interacts with a car dealer website. The user interacts with information about the price and appearance of a particular car model.

Stage 2 304 is a second stage in the user's journey. In stage 2, the user again visits the car dealer website several times within a one-week period commencing five days after the initial visit in stage 1. The user visits a webpage on the website about the same car model's performance and views a video that provides an overview of the car in general.

Stage 3 306 is a third stage in the user's journey. In stage 3, the user clicks on a link in a marketing email from the car manufacturer, which leads the user to view a webpage on the website about a promotional offer that is going on for the next month. Stage 4 308 is a fourth stage in the user's journey, where the user returns to the car manufacturer's website and again interacts with webpages focused on the appearance of the same car model, as well as items focused on the performance of the same car model.

Stage 5 310 is a fifth stage in the user's journey, in which the user interacts with items focused on the performance of the same car model, a webpage about another similar car model, and a "contact us" link where the user sets up an appointment to test drive a car. After following the journey through the conversion pipeline from stage 1 through stage 5, the user performs predicted future action 312 when they purchase the car they have been researching.

Figure 4:
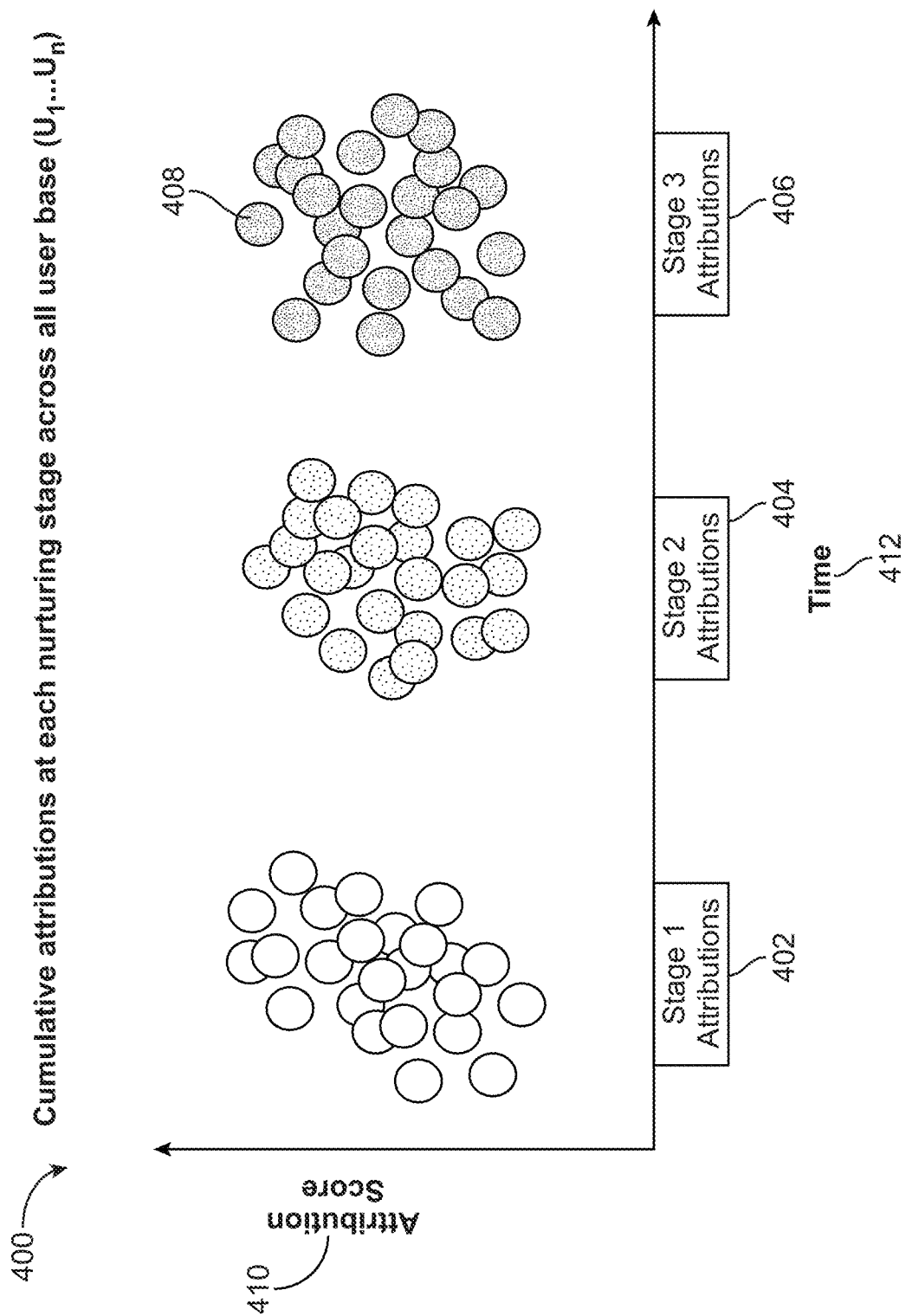
FIG. 4 depicts an example of stage attributions for a set of users, according to certain aspects.

FIG. 4 depicts an example of a plot 400 of stage attributions for a set of users, according to certain aspects. FIG. 4 illustrates the different attribution scores 410 as a function of time 412 for a set of events for different users at each stage. Each dot 408 represents the attribution score at a given stage for an individual user. All attribution is ranked equally amongst stages.

Stage 1 attributions 402 represent events associated with each user during stage 1. Each dot shows attributes corresponding to events associated with a user such as what marketing pages user is currently surfing through, what items, objects, assets user is currently clicking, time duration of user on stay on any of these assets, what channel user is currently walking through, what device user is in, etc. Stage 2 attributions 404 represent events associated with each user during stage 2. Stage 3 attributions 406 represent events associated with each user during stage 3. For each stage, the plot 400 shows cumulative attributions at each nurturing stage across all users in user base ($U_1 \ldots U_n$).

Example Time-Decay Modeling

Figure 5:
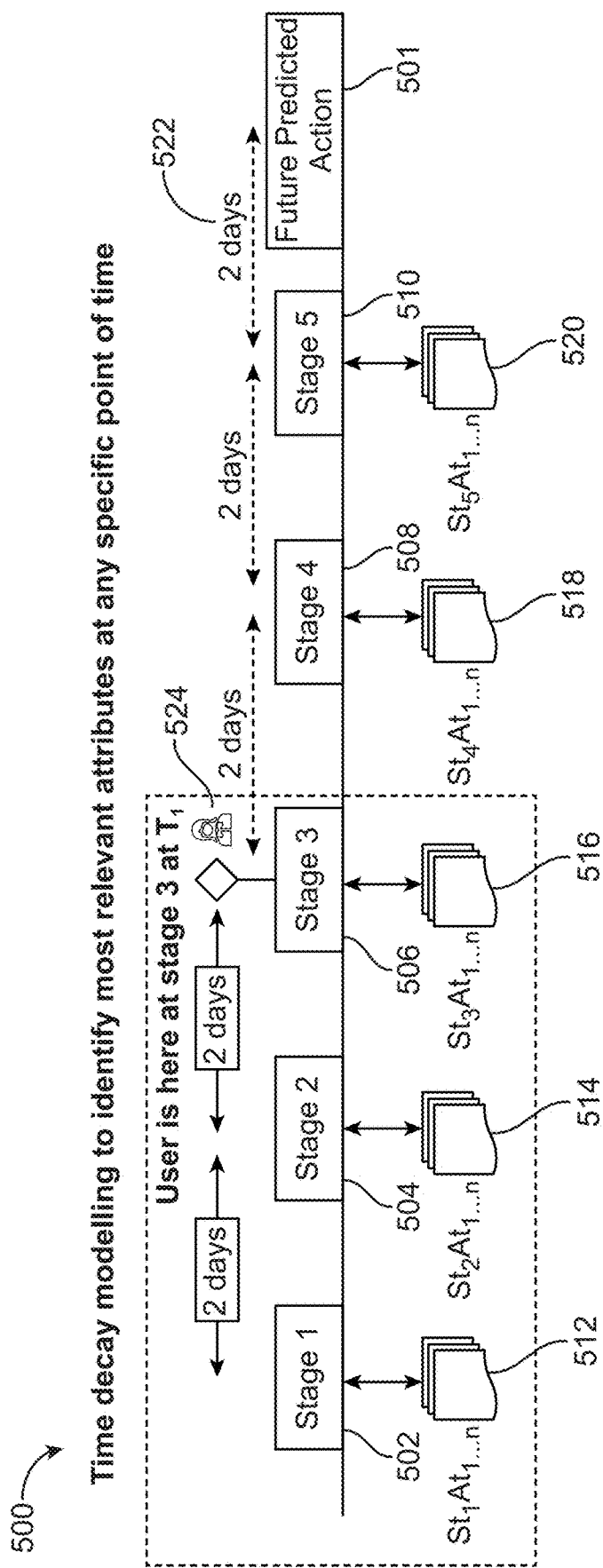
FIG. 5 depicts an example of an application of time-decay modeling, according to certain aspects.

FIG. 5 depicts an example of a schematic diagram 500 of time decay modeling, according to certain aspects. A user progresses through a set of stages 502-510 on a journey towards a future predicted action 501. Time decay modeling functions are applied to the attribution score at each stage 502-510 to generate time-decayed metrics 512-520, such that the time-decayed metrics for more recent events are weighted more heavily than the time-decayed metrics for less recent events.

At stage 1 502, the time-decayed metric 512 is given by $St_1 At_{1 \ldots n} \cdot S_{t1}$ is the current stage, stage 1, and $A_{t1 \ldots n}$ is the attribution score for that stage for each attribute. Each individual stage can have multiple attributes (e.g., $A_{t1}$ is a first attribute, $A_{t2}$ is a second attribute, and so forth). These attributes specify things that the user is interacting with at these individual stages (e.g. what marketing pages user is currently surfing through, what items, objects, or assets user is currently clicking, a time duration of user on stay on any of these assets, etc.).

The time-decayed metric is weighted such that the time-decayed metric increases as the current time approaches the predicted time of the future event. For example, in some implementations, A is given by $A=2^{-x/7}$, where x is the number of days from the future predicted event, as described above with respect to FIG. 2.

At stage 2 504, the time-decayed metric 514 is given by $St_2 At_{1 \ldots n} \cdot S_{t2}$ is the current stage, stage 2, and $A_{t1 \ldots n}$ is the attribution score for that stage for each attribute. The time-decayed metric for stage 2 is weighted more heavily than the attribution score for stage 1, as stage 2 is closer in time to the future predicted action 501.

At stage 3 506, the time-decayed metric 516 is given by $St_3 At_{1 \ldots n} \cdot S_{t3}$ is the current stage, stage 3, and $A_{t1 \ldots n}$ is the attribution score for that stage for each attribute. The time-decayed metric for stage 3 is weighted more heavily than the time-decayed metric for stages 1 and 2, as stage 3 closer in time to the future predicted action 501.

At stage 4 518, the time-decayed metric 518 is given by $St_4 At_{1 \ldots n} \cdot S_{t4}$ is the current stage, stage 4, and $A_{t1 \ldots n}$ is the attribution score for that stage for each attribute. The time-decayed metric for stage 4 is weighted more heavily than the time-decayed metric for stages 1, 2, and 3, as stage 4 closer in time to the future predicted action 501.

At stage 5 520, the time-decayed metric 520 is given by $St_5 At_{1 \ldots n} \cdot S_{t5}$ is the current stage, stage 5, and $A_{t1 \ldots n}$ is the attribution score for that stage for each attribute. The time-decayed metric for stage 5 is weighted more heavily than the attribution score for stages 1, 2, 3, and 4, as stage 5 closer in time to the future predicted action 501.

Figure 6:
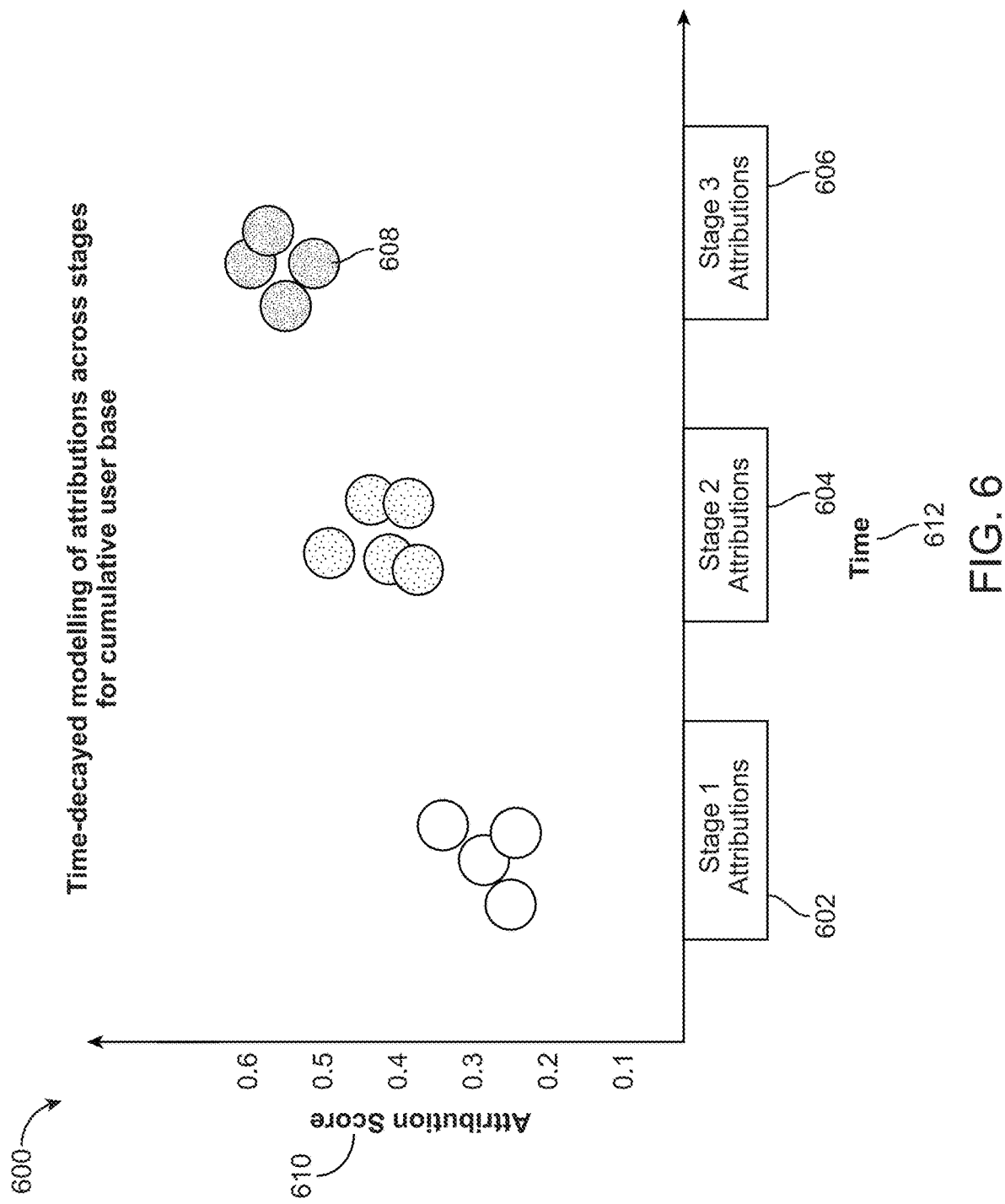
FIG. 6 depicts an example of stage attributions for a set of users after the application of time-decay modeling, according to certain aspects.

FIG. 6 depicts an example of a plot 600 of stage attributions for a set of users after the application of time-decay modeling, according to certain aspects. Similarly to FIG. 4, the plot 600 displays attribution scores 610 as a function of time 612. In FIG. 6, the time-decay modeling has been applied. Accordingly, the attributions 608 for each user are different. In particular, the attribution scores 610 are now weighted, such that the attributions scores 610 for stage 3 606 have increased with respect to the attribution scores at stage 2 604, which in turn have increased with respect to the attribution scores at stage 1 602. As can be seen from the attribution scores 608 for each stage 602-606, the overall attribution scores for the user are higher as the stages progress with time.

Figure 7:
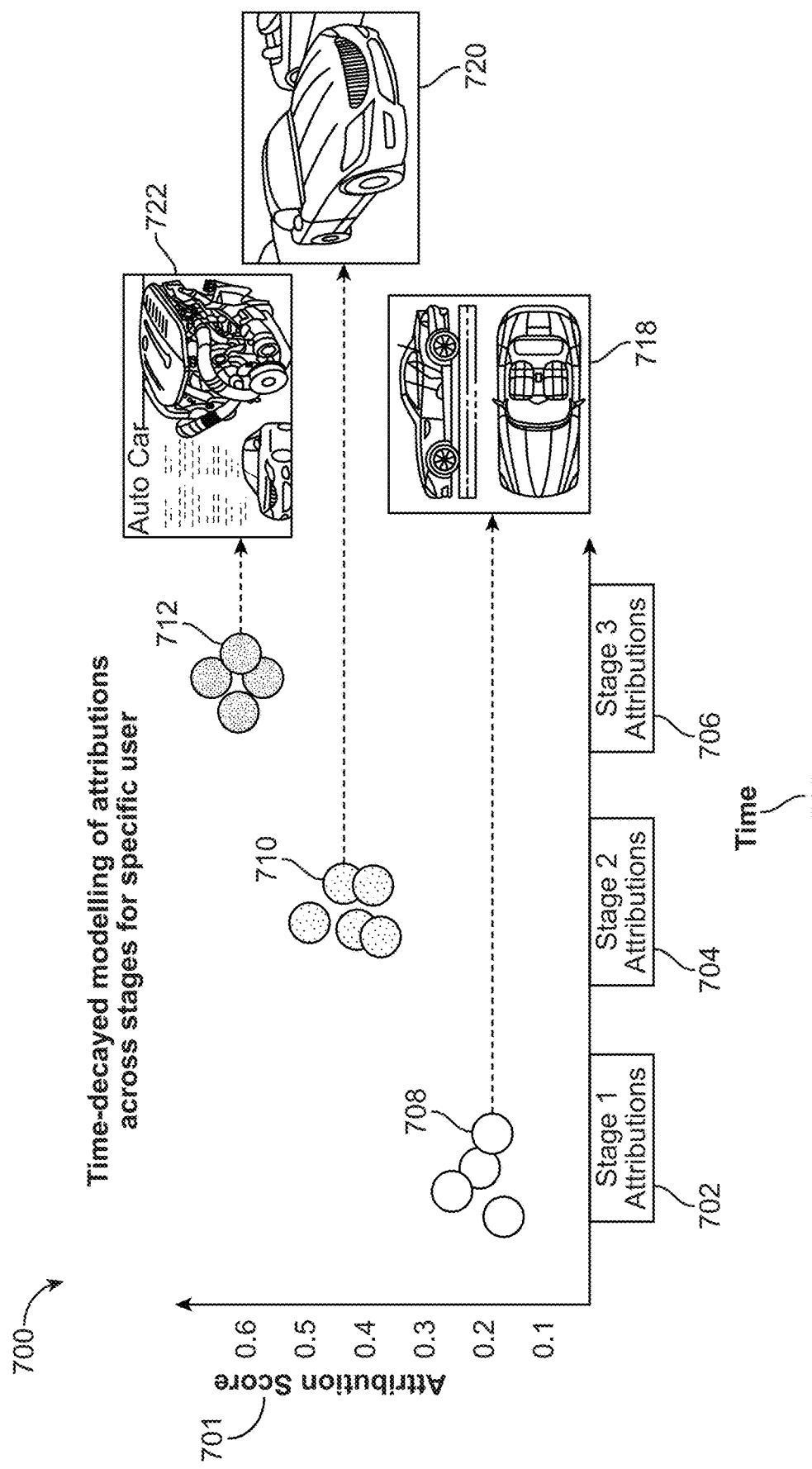
FIG. 7 depicts an example of a graph illustrating time-decayed modeling of attributions across stages for a specific user, according to certain aspects.

FIG. 7 depicts an example of a graph 700 illustrating time-decayed modeling of attributions across stages for a specific user, according to certain aspects. The graph 700 plots the time-decayed attribution score 701 for the user vs time 703 across three stages 702-706. In stage 1 702, the user's attributions 708 primarily related to the overall specifications of a car 718. In stage 2 704, the user's attributions 710 primarily relate to the appearance and design of a car 720. In stage 3 706, the user's attributions 712 primarily relate to the engine specifications of a car 722. As can be seen from the time-decayed metrics 708-712 for each stage 702-706, the overall time-decayed metrics for the user are higher as the stages progress with time.

Examples of Thumbnail Interfaces

Figure 8:
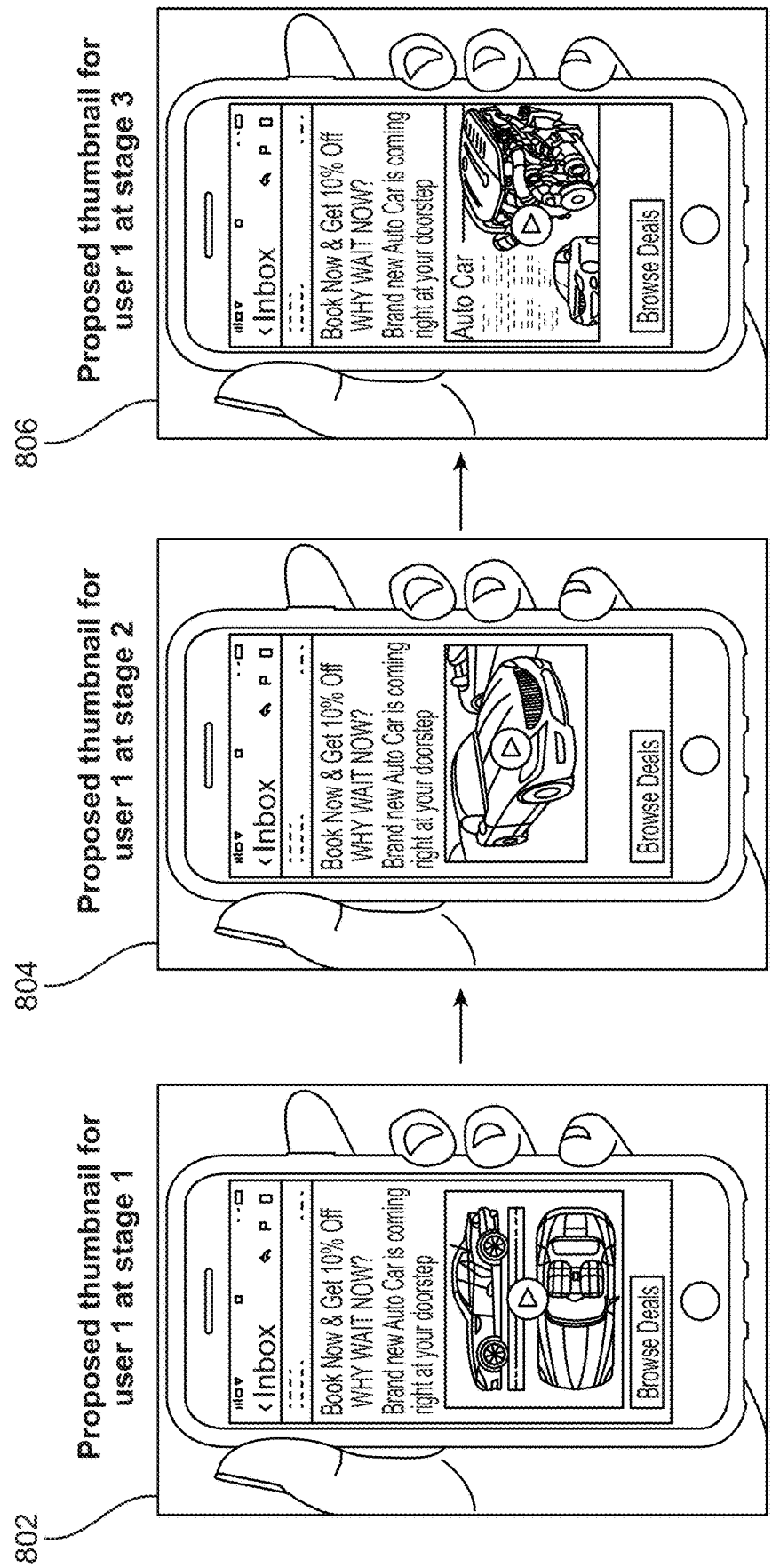
FIG. 8 depicts examples of interfaces illustrating selected thumbnails at different stages for a particular user, according to certain aspects.
Figure 9:
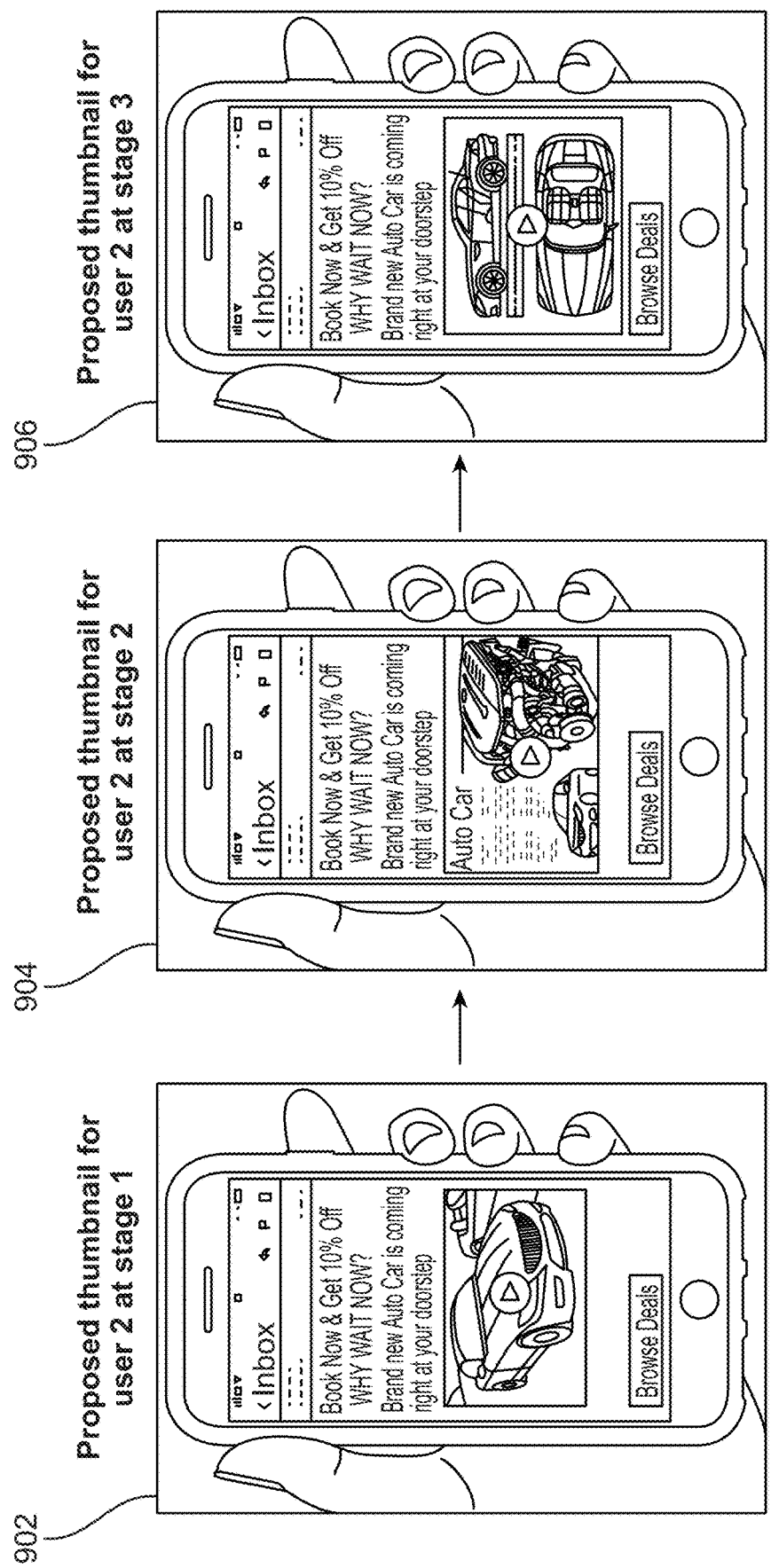
FIG. 9 depicts examples of interfaces illustrating selected thumbnails at different stages for another user, according to certain aspects.

FIGS. 8 and 9 depict examples of interfaces illustrating thumbnails that are selected and displayed at different stages for two different users, according to certain aspects. In this example, the thumbnails are generated for a video embedded in an email. The video relates to automobile marketing material based on events detected for each respective user in each respective stage.

In FIG. 8, three thumbnail interfaces 802-806 are shown for a first user, User 1. For User 1, based on the time-decayed metric, events associated with user 1 are mostly focused on the general car specifications. Accordingly, for User 1, the stage 1 video thumbnail 802 relates to general car specifications.

At stage 2, the user would see a different thumbnail since at that moment, the attribution is primarily focused on the beauty and style of the car. Hence, the stage 2 video thumbnail 804 relates to the beauty and style of the car, thus increasing the probability of the user viewing the video in the email.

At stage 3, the user would see a different thumbnail since at that moment, the attribution is primarily focused on the engine performance of the car. Hence, the stage 3 video thumbnail 806 relates to the performance of the car, thus increasing the probability of the user viewing the video in the email.

FIG. 9 depicts examples of interfaces illustrating selected thumbnails at different stages for another user, User 2, according to certain aspects. Since each user is unique and different from the other users, in this example, User 2 has interests, engagement, and attributions that are different at different stages than User 1. In this case, User 2 would be shown different thumbnails in the videos embedded in the email, as User 2 showed a higher engagement to the car's beauty, style in stage 1, while in stage 2, User 2 was primarily focused on knowing more about car performance, and in stage 3, User 2 was mostly interacting with content related to the overall specifications of the car. Thus, the thumbnails that User 2 are shown are different at each stage than what User 1 is shown.

In particular, based on User 2's event data and time-decayed metric, the stage 1 video thumbnail 902 relates to car specifications. The stage 2 video thumbnail 904 relates to the performance of the car. The stage 3 video thumbnail 906 relates to the overall specifications of the car for User 2.

Example of a Computing System for Video Thumbnail Selection and Presentation

Figure 10:
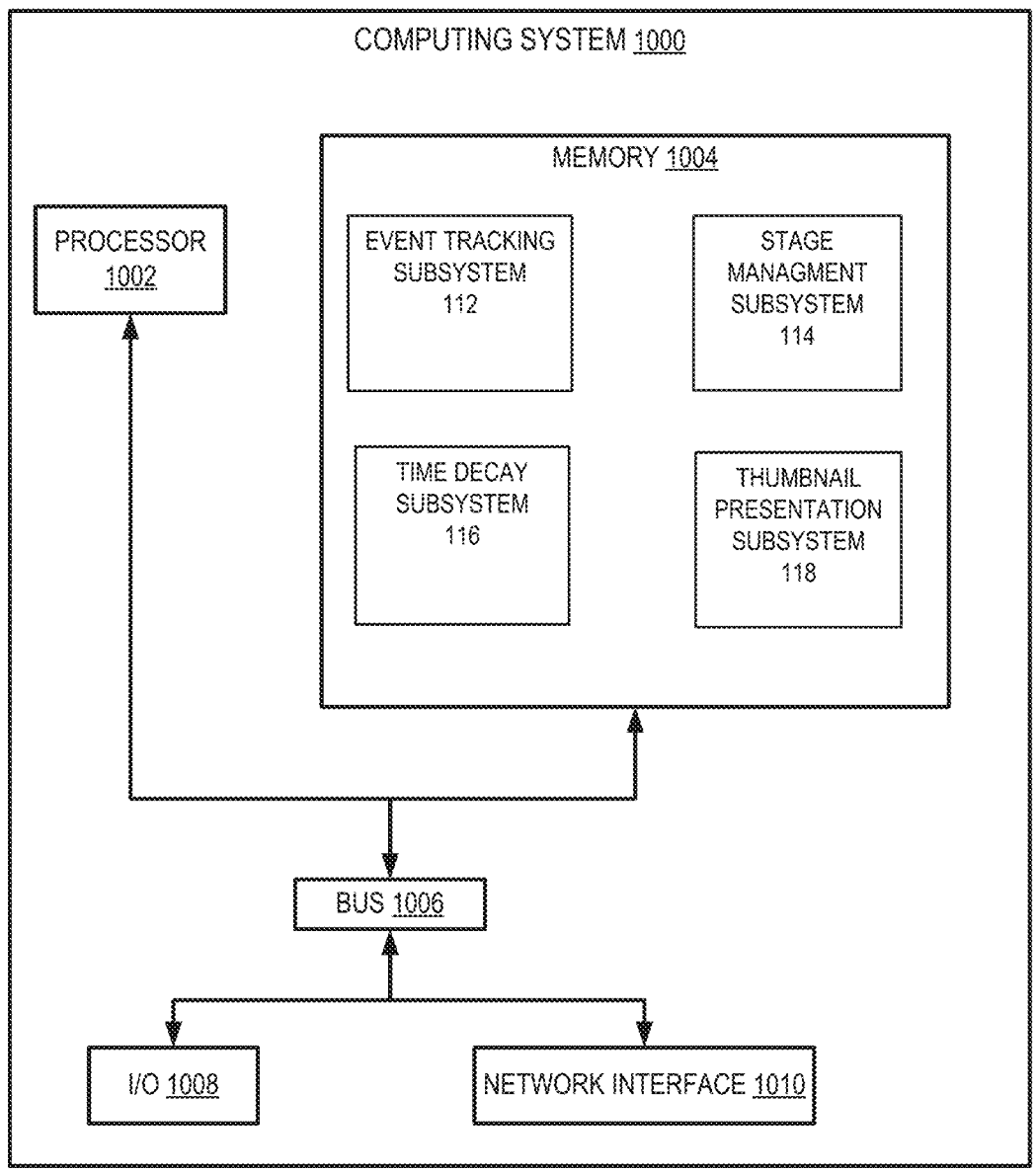
FIG. 10 depicts an example of a computing system that performs certain operations described herein, according to certain aspects of the present disclosure.

Any suitable computing system or group of computing systems can be used for performing the operations described herein. For example, FIG. 10 depicts examples of computing system 1000 that executes a thumbnail presentation subsystem 118. In some aspects, the computing system 1000 also executes the event tracking subsystem 112, stage management subsystem 114, and/or time decay subsystem 116 as depicted in FIG. 1. In other aspects, a separate computing system having devices similar to those depicted in FIG. 10 (e.g., a processor, a memory, etc.) executes one or more of the subsystems 112-118.

The depicted examples of a computing system 1000 includes a processor 1002 communicatively coupled to one or more memory devices 1004. The processor 1002 executes computer-executable program code stored in a memory device 1004, accesses information stored in the memory device 1004, or both. Examples of the processor 1002 include a microprocessor, an application-specific integrated circuit ("ASIC"), a field-programmable gate array ("FPGA"), or any other suitable processing device. The processor 1002 can include any number of processing devices, including a single processing device.

The memory device 1004 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 1000 may also include a number of external or internal devices, such as input or output devices. For example, the computing system 1000 is shown with one or more input/output ("I/O") interfaces 1008. An I/O interface 1008 can receive input from input devices or provide output to output devices. One or more buses 1006 are also included in the computing system 1000. The bus 1006 communicatively couples one or more components of a respective one of the computing system 1000.

The computing system 1000 executes program code that configures the processor 1002 to perform one or more of the operations described herein. The program code includes, for example, the event tracking subsystem 112, stage management subsystem 114, time decay subsystem 116, thumbnail presentation subsystem 118, and/or other suitable applications that perform one or more operations described herein. The program code may be resident in the memory device 1004 or any suitable computer-readable medium and may be executed by the processor 1002 or any other suitable processor. In some aspects, both the event tracking subsystem 112 and the stage management subsystem 114 are stored in the memory device 1004, as depicted in FIG. 10. In additional or alternative aspects, one or more of the event tracking subsystem 112, stage management subsystem 114, time decay subsystem 116, and/or thumbnail presentation subsystem 118 are stored in different memory devices of different computing systems. In additional or alternative aspects, the program code described above is stored in one or more other memory devices accessible via a data network.

The computing system 1000 can access one or more of the subsystems 112-118 in any suitable manner. In some aspects, some or all of one or more of these data sets, models, and functions are stored in the memory device 1004, as in the example depicted in FIG. 10.

In additional or alternative aspects, one or more of these data sets, models, and functions are stored in the same memory device (e.g., one of the memory device 1004). For example, a common computing system, such as the thumbnail selection system 110 depicted in FIG. 1, can host the event tracking subsystem 112, and stage management subsystem 114 as well as the thumbnail presentation subsystem 118. In additional or alternative aspects, one or more of the programs, data sets, models, and functions described herein are stored in one or more other memory devices accessible via a data network.

The computing system 1000 also includes a network interface device 1010. The network interface device 1010 includes any device or group of devices suitable for establishing a wired or wireless data connection to one or more data networks. Non-limiting examples of the network interface device 1010 include an Ethernet network adapter, a modem, and the like. The computing system 1000 is able to communicate with one or more other computing devices (e.g., the user device 102 as depicted in FIG. 1) via a data network using the network interface device 1010.

Figure 11:
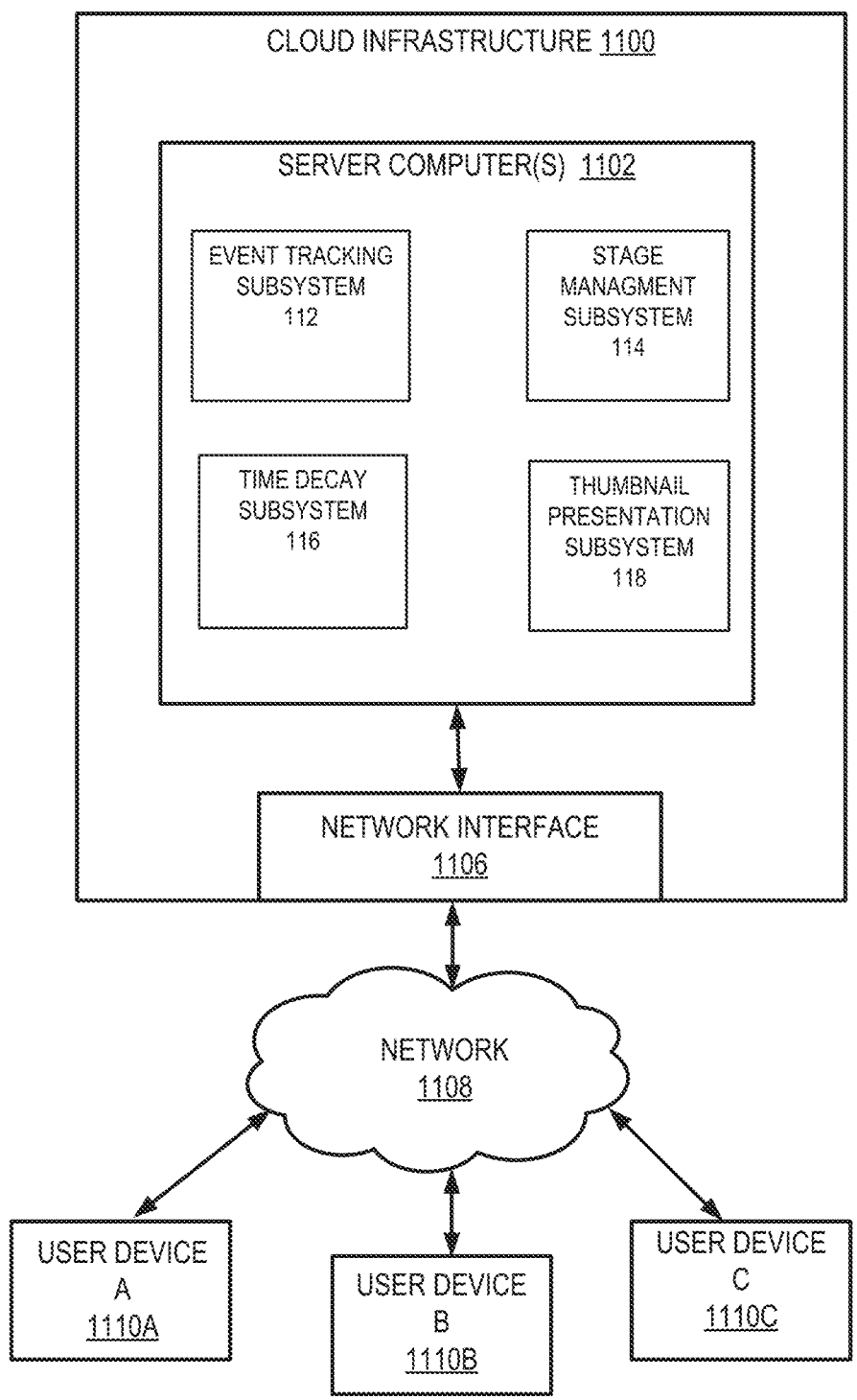
FIG. 11 depicts an example of a cloud computing environment that performs certain operations described herein, according to certain aspects of the present disclosure.

In some aspects, the functionality provided by the computing system 1000 may be offered via a cloud-based service provided by a cloud infrastructure 1100 provided by a cloud service provider. For example, FIG. 11 depicts an example of a cloud infrastructure 1100 offering one or more services including a service that offers virtual object functionality as described in this disclosure. Such a service can be subscribed to and used by a number of user subscribers using user devices 1110A, 1110B, and 1110C across a network 1108. The service may be offered under a Software as a Service (SaaS) model. One or more users may subscribe to such as service.

In the aspect depicted in FIG. 11, the cloud infrastructure 1100 includes one or more server computer(s) 1102 that are configured to perform processing for providing one or more services offered by the cloud service provider. One or more of server computer(s) 1102 may implement an event tracking subsystem 112, stage management subsystem 114, time decay subsystem 116, and/or thumbnail presentation subsystem 118 as depicted in FIG. 1. The subsystems 112-118 may be implemented using software only (e.g., code, program, or instructions executable by one or more processors provided by cloud infrastructure 1100), in hardware, or combinations thereof. For example, one or more of the server computer(s) 1102 may execute software to implement the services and functionalities provided by subsystems 112-118, where the software, when executed by one or more processors of the server computer(s) 1102, causes the services and functionalities to be provided.

The code, program, or instructions may be stored on any suitable non-transitory computer-readable medium such as any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript. In various examples, the server computer(s) 1102 can include volatile memory, non-volatile memory, or a combination thereof.

In the aspect depicted in FIG. 11, cloud infrastructure 1100 also includes a network interface device 1106 that enables communications to and from cloud infrastructure 1100. In certain aspects, the network interface device 1106 includes any device or group of devices suitable for establishing a wired or wireless data connection to the network 1108. Non-limiting examples of the network interface device 1106 include an Ethernet network adapter, a modem, and/or the like. The cloud infrastructure 1100 is able to communicate with the user devices 1110A, 1110B, and 1110C (e.g., the user device 102 depicted in FIG. 1) via the network 1108 using the network interface device 1106.

A graphical interface may be displayed on each of the user devices user device A 1110A, user device B 1110B, and user device C 1110C. A user of user device 1110A may interact with the displayed graphical interface, for example, to enter text data and upload media files. In response, processing for identifying and displaying privacy alerts may be performed by the server computer(s) 1102. Responsive to these alerts, the user may again interact with the graphical interface to edit the text data to address any privacy concerns.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific aspects thereof, it will be appreciated that those skilled in the art, upon attaining an understanding of the foregoing, may readily produce alterations to, variations of, and equivalents to such aspects. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A computer-implemented method comprising:
   identifying, by a server computer, events associated with prior interactions of a user;
   determining, by the server computer, a time of a predicted future action of the user;
   computing, by the server computer, a time-decayed metric based on the time of the predicted future action of the user in comparison to a respective time of each event, of the identified events, wherein a first event that is closer in time to the predicted future action than a second event has a greater contribution to the time-decayed metric than the second event;
   selecting, by the server computer and based on the time-decayed metric, a particular video thumbnail that is more relevant to the first event than the second event;
   receiving, by the server computer, an indication of user interaction with a link associated with an interactive content item to be provided to a computing device associated with the user, wherein the indication of user interaction is associated with the user; and including, by the server computer and responsive to receiving the indication of user interaction with the link, the selected video thumbnail in a selectable interface element in the interactive content item, wherein an interaction with the selectable interface element causes display of a video associated with the particular video thumbnail.

2. The method of claim 1, wherein the time-decayed metric is a score computed by the server computer as a function of an identified current stage of behavior of the user.

3. The method of claim 2, wherein the score for a given event is an exponential function of a time of the given event subtracted from the time of the predicted future action of the user.

4. The method of claim 1, further comprising:
prior to selecting the video thumbnail, causing display of the interactive content item with a default thumbnail, wherein the server computer updates the interactive content item to display the video thumbnail upon selecting the video thumbnail.

5. The method of claim 1, wherein the indication of user interaction with the link is a first indication of user interaction with the link and the video thumbnail is a first video thumbnail, the method further comprising:
detecting, by the server computer, user interaction with the selectable interface element;
based on detecting the user interaction with the selectable interface element, updating, by the server computer, the events associated with the prior interactions of the user;
receiving, by the server computer, a second indication of user interaction with the link;
identifying, by the server computer, the updated events associated with prior interactions of the user; and
responsive to receiving the second indication and identifying the updated events, including, by the server computer, a second video thumbnail in the selectable interface element in the interactive content item to be provided to the computing device associated with the user, wherein the second video thumbnail is different than the first video thumbnail and associated with the same video.

6. The method of claim 1, wherein:
the server computer determines the time of the predicted future action of the user using a clustering model to identify other users associated with similar prior events and predict the time of the future action of the user based on times of identified actions of the other users.

7. The method of claim 6, wherein the user is clustered with the other users based on a sequence of events associated with the user and a sequence of events associated with the other users.

8. The method of claim 1, wherein the interaction with the link is associated with a webpage or an electronic mail (email) message.

9. A computing system comprising:
a processor and a non-transitory computer-readable medium coupled to the processor, the non-transitory computer-readable medium including instructions which, when executed by the processor, cause performance of a method comprising:
receiving an indication of user interaction with a link associated with an interactive content item; and
a step for selecting a particular video thumbnail, of a plurality of potential thumbnails of a video, based on a time-decayed metric and events associated with prior interactions of a user associated with the interaction; and
responsive to receiving the indication of user interaction with the link and selecting the video thumbnail, including the selected video thumbnail in a selectable interface element in the interactive content item to be provided to a computing device associated with the user, wherein an interaction with the selectable interface element causes display of a video associated with the particular video thumbnail.

10. The computing system of claim 9, wherein the time-decayed metric is a score computed as a function of an identified current stage of behavior of the user, wherein the score for a given event is an exponential function of a time of the given event subtracted from a time of a predicted future action of the user.

11. The computing system of claim 9, wherein the indication of user interaction with the link is a first indication of user interaction with the link and the video thumbnail is a first video thumbnail, the method further comprising:
detecting user interaction with the selectable interface element;
based on detecting the user interaction with the selectable interface element, updating the events associated with the prior interactions of the user;
receiving a second indication of user interaction with the link;
identifying the updated events associated with prior interactions of the user; and
responsive to receiving the second indication and identifying the updated events, including a second video thumbnail in the selectable interface element in the interactive content item to be provided to the computing device associated with the user, wherein the second video thumbnail is different than the first video thumbnail and associated with the same video.

12. The computing system of claim 11, wherein the detected interaction is with a webpage or an electronic mail (email) message.

13. A non-transitory computer-readable medium having instructions stored thereon, the instructions executable by a processing device to perform operations comprising:
receiving an indication of user interaction with a link associated with an interactive content item;
identifying events associated with prior interactions of a user associated with the user interaction;
computing a time-decayed metric based on a time of a predicted future action of the user in comparison to a respective time of each event, of the identified events, wherein a first event has a greater contribution to the time-decayed metric than a second event;
selecting, based on the time-decayed metric, a particular video thumbnail that is more relevant to the first event than the second event; and
responsive to receiving the indication of user interaction with the link and selecting the video thumbnail, including the selected video thumbnail in a selectable interface element in the interactive content item to be provided to a computing device associated with the user, wherein an interaction with the selectable interface element causes display of a video associated with the particular video thumbnail.

14. The non-transitory computer-readable medium of claim 13, wherein the time-decayed metric is a score computed as a function of an identified current stage of behavior of the user.

15. The non-transitory computer-readable medium of claim 14, wherein the score for a given event is an exponential function of a time of the given event subtracted from the time of the predicted future action of the user.

16. The non-transitory computer-readable medium of claim 13, the operations further comprising:
prior to selecting the video thumbnail, causing display of the interactive content item with a default thumbnail, wherein the interactive content item is updated to display the video thumbnail upon selecting the video thumbnail.

17. The non-transitory computer-readable medium of claim 13, wherein the indication of user interaction with the link is a first indication of user interaction with the link and the video thumbnail is a first video thumbnail, the operations further comprising:
detecting user interaction with the selectable interface element;
based on detecting the user interaction with the selectable interface element, updating the events associated with the prior interactions of the user;
receiving a second indication of user interaction with the link;
identifying the updated events associated with prior interactions of the user; and
responsive to receiving the second indication and identifying the updated events, including a second video thumbnail in the selectable interface element in the interactive content item to be provided to the computing device associated with the user, wherein the second video thumbnail is different than the first video thumbnail and associated with the same video.

18. The non-transitory computer-readable medium of claim 17, wherein:
the time of the predicted future action of the user is determined using a clustering model to identify other users associated with similar prior events and predict the time of the future action of the user based on times of identified actions of the other users.

19. The non-transitory computer-readable medium of claim 18, wherein the user is clustered with the other users based on a sequence of events associated with the user and a sequence of events associated with the other users.

20. The non-transitory computer-readable medium of claim 13, wherein the interaction with the link is associated with a webpage or an electronic mail (email) message.

* * * * *